United States Patent [19]

Wood et al.

[11] Patent Number: 5,037,603
[45] Date of Patent: Aug. 6, 1991

[54] HAND HELD TOOL FOR REMOVING AND REPLACING A TOP NOZZLE LOCKING TUBE

[75] Inventors: John D. Wood, Hempfield Township, Westmoreland County; Juan J. Fernandez, Harmony, both of Pa.

[73] Assignee: Westinghouse Electric Corp., Pittsburgh, Pa.

[21] Appl. No.: 562,286

[22] Filed: Aug. 3, 1990

[51] Int. Cl.⁵ ............................................. G21C 19/10
[52] U.S. Cl. ..................................... 376/260; 29/723; 294/97
[58] Field of Search ............... 376/261, 262, 260, 446; 294/97; 29/426.5, 906, 723, 281.4, 157.36, 255, 282

[56] References Cited

U.S. PATENT DOCUMENTS

| | | | |
|---|---|---|---|
| 1,365,857 | 1/1921 | Seder | 173/132 |
| 2,641,831 | 6/1953 | Helton | 29/255 |
| 3,423,120 | 1/1969 | Dalglish | 294/97 |
| 4,244,616 | 1/1981 | Buchalet | 294/86 A |
| 4,336,103 | 6/1982 | Katscher | 376/245 |
| 4,631,168 | 12/1986 | Shallenberger et al. | 376/446 |
| 4,638,543 | 1/1987 | Shallenberger et al. | 29/426.5 |
| 4,639,998 | 2/1987 | Shallenberger et al. | 29/426.5 |
| 4,664,874 | 3/1987 | Shallenberger et al. | 376/361 |
| 4,699,758 | 10/1987 | Shallenberger et al. | 376/446 |
| 4,728,217 | 3/1988 | Fink | 403/290 |

FOREIGN PATENT DOCUMENTS 2417828 9/1979 France .
967203 8/1964 United Kingdom .

*Primary Examiner*—Daniel D. Wasil
*Assistant Examiner*—Frederick H. Voss

[57] ABSTRACT

A hand held tool for removing a hollow locking tube from a locking position in the upper end portion of a guide thimble includes an elongated hollow tubular assembly having a lower end portion insertable in the locking tube and an actuator assembly mounted through the tubular assembly for axial movement therealong and having a lower end portion for actuating a set of lifting members of the lower end portion of the tubular assembly to extend and retract their catch elements through and from apertures in the tubular assembly for engaging with and disengaging from a lower edge of the locking tube. The lower end portion of the tubular assembly includes a guide member composed of a hollow tubular element and a guide element interfitted with an open end of the tubular element and having a body portion projecting therefrom. The tubular element has the apertures through which the catch elements on the lifting members can be extended to engage the lower edge of the locking tube. The end of the tubular element and the body portion of the guide element have substantially the same outside diameter so as to provide a continuous smooth transition from the tubular element end to the guide element body portion for facilitating insertion of the guide and tubular elements of the guide member into the hollow locking tube without catching on an upper edge thereof at the transition of the guide member.

16 Claims, 7 Drawing Sheets

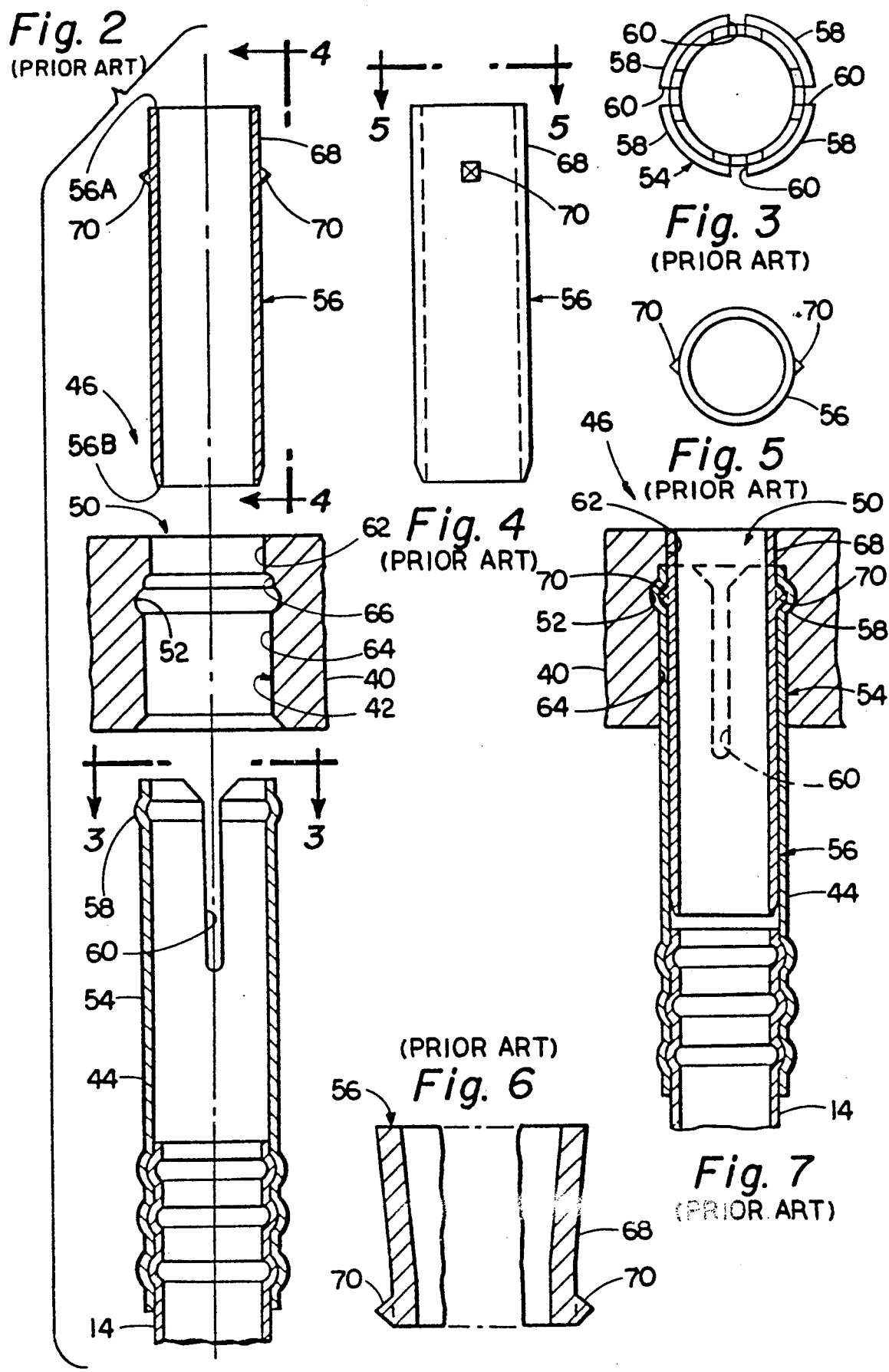

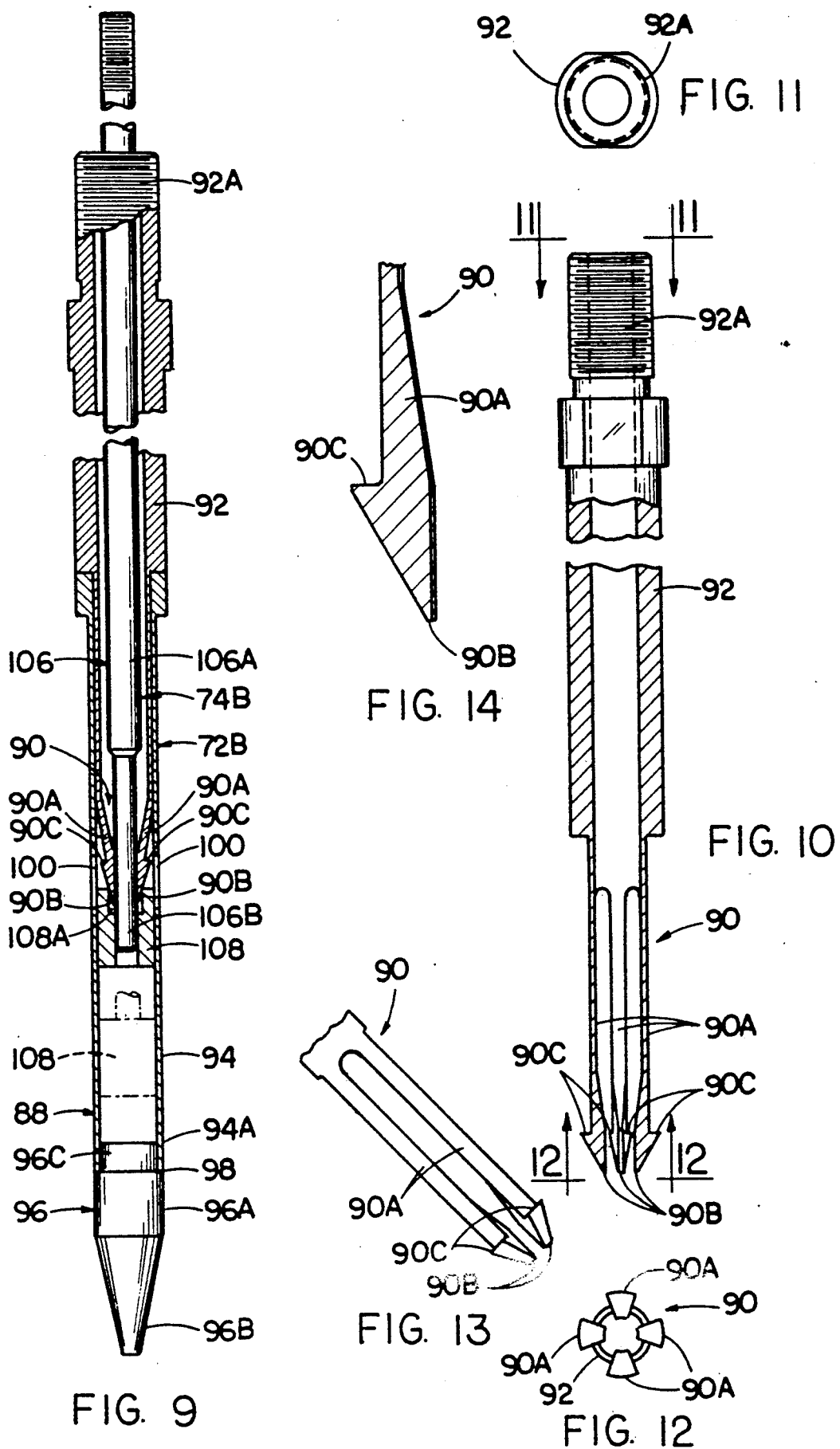

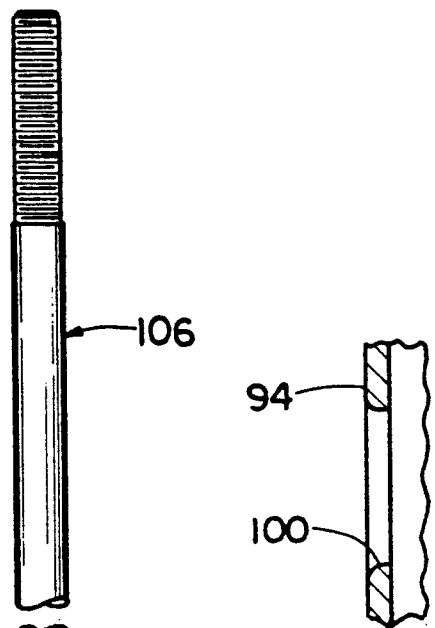
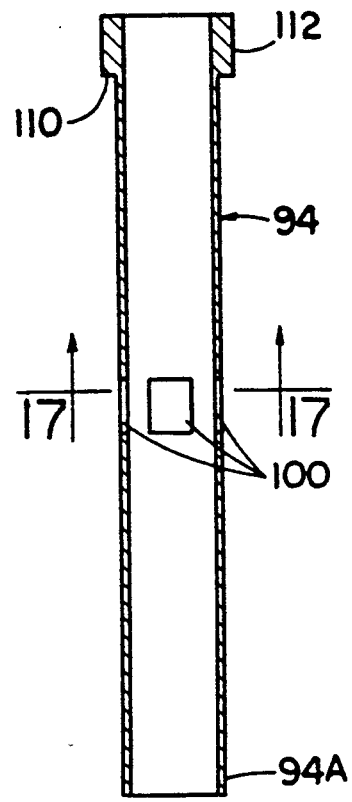
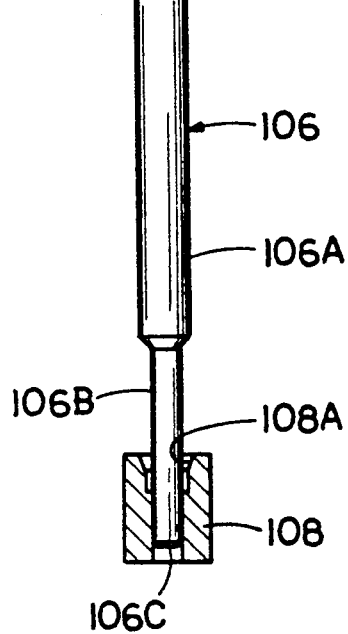
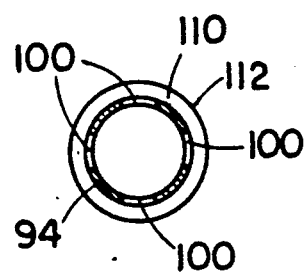
FIG. 18
FIG. 16
FIG. 15
FIG. 17

HAND HELD TOOL FOR REMOVING AND REPLACING A TOP NOZZLE LOCKING TUBE

BACKGROUND OF THE INVENTION

1. Field of the Invention

The present invention relates generally to fuel assemblies for nuclear reactors and, more particularly, is concerned with an improved hand held tool for removing and replacing a locking tube in a removable top nozzle of a reconstitutable fuel assembly.

2. Description of the Prior Art

In most nuclear reactors, the reactor core is comprised of a large number of elongated fuel assemblies. Conventional designs of these fuel assemblies include a plurality of fuel rods and control rod guide thimbles held in an organized array by grids spaced along the fuel assembly length and attached to the control rod guide thimbles. Top and bottom nozzles on opposite ends of the fuel assembly are secured to the guide thimbles which extend slightly above and below the ends of the fuel rods. At the top of the fuel assembly, the guide thimbles are attached in passageways provided in the adapter plate of the top nozzle. The guide thimbles may each include an upper sleeve for attachment to the top nozzle.

During operation of such fuel assembly in a nuclear reactor, a few of the fuel rods may occasionally develop cracks along their lengths resulting primarily from internal stresses, thus establishing the possibility that fission products having radioactive characteristics may seep or otherwise pass into the primary coolant of the reactor. Such products may also be released into a flooded reactor cavity during refueling operations or into the coolant circulated through pools where the spent fuel assemblies are stored. Since the fuel rods are supported by the grids in a spaced array with the guide thimbles between the top and bottom nozzles of the fuel assembly, it is difficult to detect and remove the failed fuel rods.

Until recently to gain access to these rods it was necessary to remove the affected fuel assembly from the nuclear reactor core and then break the welds securing the nozzles to the guide thimbles. In so doing, the destructive action often rendered the fuel assembly unfit for further use in the reactor because of the damage done to both the guide thimbles and the nozzle which prohibited rewelding.

In view of the high costs associated with replacing fuel assemblies, reconstitutable fuel assemblies were developed to minimize operating and maintenance expenses. The general approach to making a fuel assembly reconstitutable is to provide it with a removable top nozzle. One reconstitutable fuel assembly construction is illustrated and described in U.S. Pat. No. 4,631,168 to Shallenberger et al, which is assigned to the assignee of the present invention. It incorporates an attaching structure for removably mounting the top nozzle on the upper ends of the control rod guide thimbles.

The attaching structure includes a plurality of outer sockets defined in the adapter plate of the top nozzle, a plurality of inner sockets each formed on the upper end of one of the guide thimbles, and a plurality of removable locking tubes inserted in the inner sockets to maintain them in locking engagement with the outer sockets. Each outer socket is in the form of a passageway through the adapter plate which has an annular groove. Each inner socket is in the form of a hollow upper end portion of the guide thimble having an annular bulge which seats in the annular groove when the guide thimble end portion is inserted in the adapter plate passageway. A plurality of elongated axial slots are provided in the guide thimble upper end portion to permit inward elastic collapse of the slotted portion so as to allow the larger bulge diameter to be inserted within and removed from the annular circumferential groove in the passageway of the adapter plate. In such manner, the inner socket of the guide thimble is inserted into and withdrawn from locking engagement with the outer socket.

The locking tube is inserted from above the top nozzle into a locking position in the hollow upper end portion of the guide thimble forming the inner socket. When inserted in its locking position, the locking tube retains the bulge of the inner socket in its expanded locking engagement with the annular groove and prevents the inner socket from being moved to a compressed releasing position in which it could be withdrawn from the outer socket. In such manner, the locking tubes maintain the inner sockets in locking engagement with the outer sockets, and thereby the attachment of the top nozzle on the upper ends of the guide thimbles.

Furthermore, to prevent inadvertent escape due to vibration forces and the like, heretofore the locking tubes have been secured in their locking positions. In the one construction of the locking tubes disclosed in the above-cited patent, after insertion of the locking tubes into their locking positions within the inner sockets of the hollow upper end portions of the guide thimbles, a pair of bulges are formed in the upper portion of each locking tube. These bulges fit into the circumferential bulge in the upper end portion of the guide thimble and provide an interference fit therewith.

In another construction of the locking tubes disclosed in U.S. Pat. No. 4,699,758 to Shallenberger et al, which is also assigned to the assignee of the present invention, several small dimples are preformed on the exterior surface of the upper end portion of the locking tube circumferentially spaced from one another and projecting from the locking tube exterior surface. The use of the preformed dimples eliminates the necessity to form bulges in the locking tube after insertion into the locking position. Also the preformed dimples allow the locking tube to be reused, whereas the bulged locking tubes were discarded after each use.

The reconstitutable fuel assembly construction briefly described above has proven to be an improvement by which domestic and foreign utilities can minimize both operating and maintenance expenses. A fixture developed for removing and replacing the top nozzle of the reconstitutable fuel assembly is disclosed in U.S. Pat. No. 4,664,874 to Shallenberger et al, also assigned to the assignee of the present invention. A locking tube removal and replacement tool provided for use in conjunction with the fixture is disclosed in U.S. Pat. No. 4,639,998 to Shallenberger et al, also assigned to the assignee of the present invention. The tool used both for removal and replacement of locking tubes one at a time basically has an inner tubular member, an actuatable shaft assembly, and an outer tubular member.

The inner tubular member of the tool is attached at its upper end to a bail assembly for gripping by a user. At its lower end, the inner tubular member has an extension with an expandable and collapsible lower end in the form of a outwardly-turned annular segmented rim. The actuatable shaft assembly of the tool is mounted for axial movement within the inner tubular member and the extension thereof. The shaft assembly has an actuating knob coupled to its upper end and a conical nose disposed on its lower end. The lower conical nose extends beyond the segmented rim on the lower end of the tubular member extension.

To use the tool, the inner tubular member and the actuatable shaft assembly are inserted from above the top nozzle downwardly through one passageway of the adapter plate and the hollow interior of the locking tube and guide thimble until the segmented rim and the conical nose are disposed below the lower edge of the locking tube. Then, the knob on the shaft assembly is rotated in one direction to force insertion of the conical nose into the lower end of the tubular extension and thereby expand the segmented rim such that it will underlie and engage the lower edge of the locking tube when the inner tubular member and shaft assembly of the tool are pulled in an upward direction.

The outer tubular member of the tool is disposed about the upper end of the inner tubular member and mounted for slidable movement therealong. The outer tubular member can be manually moved in a reciprocating manner to deliver a series of forceful impacts to the bail assembly of the tool which impacts are, in turn, transmitted via the inner tubular member to the lower annular segment rim of its tubular extension. With the segmented rim expanded to underlie and engage the lower edge of the locking tube, the force of each impact will be transmitted to the lower edge of the locking tube causing displacement of the locking tube in an upward axial direction and removal of the locking tube from its locking position such that it can then be easily carried from the top nozzle by withdrawal of the inner tubular member and shaft assembly of the tool from the top nozzle adapter plate.

One major problem with the design of the above-described tool is the difficulty of initially aligning and inserting the lower end of inner tubular member and actuatable shaft assembly of the tool into the hollow interior of the locking tube. The annular segmented rim on the inner tubular member extension, by surrounding and projecting outwardly from the conical nose on the shaft assembly, provides a feature which tends to catch on the upper edge of the locking tube and obstruct insertion therein. Consequently, a need still remains for an alternative design of a tool to use to effectively and efficiently carry out removal and replacement of the locking tubes.

SUMMARY OF THE INVENTION

The present invention provides an improved hand held tool designed to satisfy the aforementioned needs. The tool has an external configuration with smooth transitions between exterior surfaces of assembled parts for ease of alignment and insertion into the hollow locking tube. The tool is manually held and actuated by a user and capable of precise operation in removing the locking tube from and replacing it in the locking position in the removable top nozzle of the reconstitutable fuel assembly.

Accordingly, the present invention sets forth a tool for removing and replacing a hollow locking tube from its locking position in reconstituting a fuel assembly. The fuel assembly includes a removable top nozzle with an adapter plate having at least one passageway, at least one guide thimble with an upper end portion, and an attaching structure having the hollow locking tube for releasably locking the upper end portion of the guide thimble within the passageway of the top nozzle adapter plate.

The tool of the present invention comprises: (a) an elongated hollow tubular assembly having upper and lower opposite end portions with the lower end portion insertable in a hollow locking tube, the lower end portion including an outer tubular element having a circumferential guide wall with a plurality of circumferentially spaced apertures, the lower end portion also including a plurality of expandable and contractible lifting members disposed within the tubular element and having catch elements extendable through and retractable from the apertures of the guide wall of the tubular element for engagement with and disengagement from a lower edge of the locking tube; and (b) an actuator assembly mounted through the tubular assembly for axial movement therealong and having upper and lower end portions with the lower end portion for actuating the lifting members of the tubular assembly lower end portion between expanded and contracted conditions to extend and retract their catch elements through and from the apertures in the guide wall of the tubular assembly lower end portion for engaging with and disengaging from the lower edge of the locking tube.

More particularly, the tubular assembly lower end portion includes a guide element interfitting the tubular element at an open lower end thereof and having a body portion projecting therefrom. The end of the tubular element and the body portion of the guide element have substantially the same outside diameter so as to provide a continuous smooth transition from the guide element body to the tubular element end for facilitating insertion of the guide and tubular elements of the tubular assembly lower end portion into the hollow locking tube without catching on an upper edge of the locking tube at the transition.

Also, the lower end portion of the actuator assembly includes an elongated shaft member extending between the lifting members of the tubular assembly and having upper and lower tandemly-arranged segments, the upper segment being larger in outside diameter than the lower segment such that downward movement of the shaft member removes the lower segment from between the lifting members and inserts the upper segment between the lifting members causing engagement therewith and expansion of the finger elements from contracted to expanded condition, whereas upward movement of the shaft member removes the upper segment from between the lifting members and inserts the lower segment therebetween permitting contraction of the finger elements from the expanded to contracted condition.

Further, the lifting members of the tubular assembly have tapered tips. The elongated shaft member extending between and past the lifting members mounts a retractor member at a lower end of the shaft member. The retractor member has a tapered portion for engaging the tapered tips of the lifting members and ensuring that the lifting members move from the expanded to contracted condition as the shaft member is moved upwardly.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 2 is an axially sectioned exploded view of the components of a prior art attaching structure associated with the top nozzle and each of the guide thimbles of the reconstitutable fuel assembly of FIG. 1.

FIG. 3 is a top plan of the upper end of one guide thimble being a component of the prior art attaching structure as seen along line 3—3 of FIG. 2.

FIG. 4 is a side elevational view of a locking tube of the prior art attaching structure as seen along line 4—4 of FIG. 2.

FIG. 5 is a top plan view of the locking tube as seen along line 5—5 of FIG. 4.

FIG. 6 is an enlarged fragmentary axially sectioned view of the upper end of the locking tube of FIG. 4.

FIG. 7 is an axially sectioned view of the components of the prior art attaching structure of FIG. 2 being assembled together.

FIG. 9 is an enlarged foreshortened axial sectional view of a hollow tubular assembly and an actuator assembly of the tool of FIG. 8 being assembled together.

FIG. 10 is an enlarged foreshortened axial sectional view of a plurality of locking tube lifting members of the tubular assembly of the tool of FIG. 8.

FIG. 11 is a top plan view of the lifting members as seen along line 11—11 of FIG. 10.

FIG. 12 is a bottom plan view of the lifting members as seen along line 12—12 of FIG. 10.

FIG. 13 is a fragmentary side elevational view of the lifting members of FIG. 10.

FIG. 14 is an enlarged fragmentary axial sectional view of one of the catch elements on one of the lifting members of FIG. 10.

FIG. 15 is an enlarged foreshortened side elevational view of an actuator shaft member of the actuator assembly of the tool of FIG. 8.

FIG. 16 is an enlarged axial sectional view of a tubular element of a guide member of the tubular assembly of the tool of FIG. 8.

FIG. 17 is a cross-sectional view of the guide member tubular element taken along line 17—17 of FIG. 16.

FIG. 18 is an enlarged fragmentary view of the guide member tubular elements of FIG. 17 depicting one aperture therein through which can extend the catch element on one of the lifting members of the tubular assembly.

DETAILED DESCRIPTION OF THE INVENTION

Figure 1:
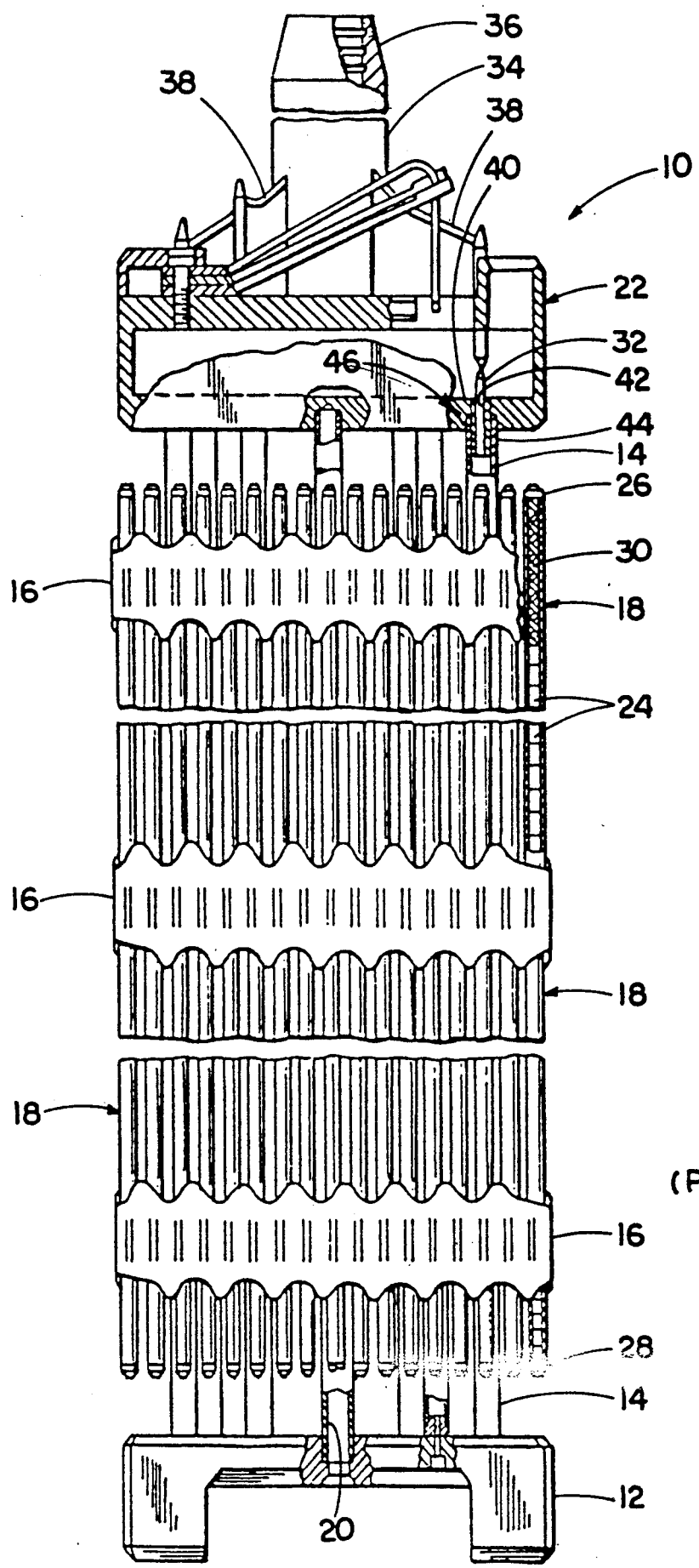
FIG. 1 is a side elevational view, with parts partially sectioned and broken away for purposes of clarity, of a prior art reconstitutable fuel assembly.

In the following description, like reference characters designate like or corresponding parts throughout the several views of the drawings. Also in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown an elevational view of a prior art reconstitutable nuclear reactor fuel assembly, represented in vertically foreshortened form and being generally designated by the numeral 10. Basically, the fuel assembly 10 includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 removably attached to the upper ends of the guide thimbles 14, in a manner fully described below, to form an integral assembly capable of being handled without damaging the assembly parts.

As mentioned above, the fuel rods 18 in the array thereof in the assembly 10 are held in spaced relationship with one another by the grids 16 spaced along the fuel assembly length. Each fuel rod 18 includes nuclear fuel pellets 24 and the opposite ends of the rod are closed by upper and lower end plugs 26,28 to hermetically seal the rod. Commonly, a plenum spring 30 is disposed between the upper end plug 26 and the pellets 24 to maintain the pellets in a tight, stacked relationship within the rod 18. The fuel pellets 24 composed of fissile material are responsible for creating the reactive power of the nuclear reactor. A liquid moderator/coolant such as water, or water containing boron, is pumped upwardly through the fuel assemblies of the core in order to extract heat generated therein for the production of useful work.

To control the fission process, a number of control rods 32 are reciprocally movable in the guide thimbles 14 located at predetermined positions in the fuel assembly 10. Specifically, the top nozzle 22 includes a rod cluster control mechanism 34 having an internally threaded cylinder member 36 with a plurality of radially extending flukes or arms 38. Each arm 38 is interconnected to a control rod 32 such that the control mechanism 34 is operable to move the control rods 32 vertically in the guide thimbles 14 to thereby control the fission process in the fuel assembly 10, all in a well-known manner.

Prior Art Top Nozzle Attaching Structure

As illustrated in FIGS. 1, 2 and 7, the top nozzle 22 has a lower adapter plate 40 with a plurality of control rod passageways 42 (only one being shown) formed through the adapter plate. The control rod guide thimbles 14 have their uppermost end portions 44 coaxially positioned within the passageways 42 in the adapter plate 40. For gaining access to the fuel rods 18, the adapter plate 40 of the top nozzle 22 is removably connected to the upper end portions 44 of the guide thimbles 14 by a prior art attaching structure, generally designated 46. The prior art attaching structure 46 is generally the same as described in above-cited U.S. Pat. No. 4,631,168, the disclosure of which is hereby incorporated by reference thereto. Thus, the attaching structure 46 will be described herein only to the extent necessary to facilitate a complete understanding of the improved tool 48 of the present invention, to be described later on in reference to FIGS. 8-18, which is employed in removing and replacing the top nozzle 22 of the fuel assembly 10.

Referring to FIGS. 2-7, the top nozzle attaching structure 46 of the reconstitutable fuel assembly 10 includes a plurality of outer sockets 50 (only one being shown) defined in the top nozzle adapter plate 40 by the plurality of passageways 42 (also only one being shown) which each contains an annular circumferential groove 52 (only one being shown), a plurality of inner sockets 54 (only one being shown) defined on the upper end portions 44 of the guide thimbles 14, and a plurality of locking tubes 56 (only one being shown) inserted in the inner sockets 54 to maintain them in locking engagement with the outer sockets 50.

Each inner socket 54 of the attaching structure 46 is defined by an annular circumferential bulge 58 on the hollow upper end portion 44 of one guide thimble 14 only a short distance below its upper edge. A plurality of elongated axial slots 60 are formed in the upper end portion 44 of each guide thimble 14 to permit inward elastic collapse of the slotted end portion to a compressed position so as to allow the circumferential bulge 58 thereon to be inserted within and removed from the annular groove 52 via the adapter plate passageway 42. The annular bulge 58 seats in the annular groove 52 when the guide thimble end portion 44 is inserted in the adapter plate passageway 42 and has assumed an expanded position. In such manner, the inner socket 54 of each guide thimble 14 is inserted into and withdrawn from locking engagement with one of the outer sockets 50 of the adapter plate 40.

More particularly, the axially extending passageway 42 in the adapter plate 40 which defines the outer socket 50 is composed of an upper bore 62 and a lower bore 64. The lower bore 64 is of considerably greater axial length than the upper bore 62 and contains the annular groove 52 which is spaced a short distance below a ledge 66 formed at the intersection of the upper and lower bores 62,64. The lower bore 64 has a diameter which is greater than that of the upper bore 62, therefore, the ledge 66 faces in a downward direction. The primary purpose of the ledge 66 is to serve as a stop or an alignment guide for proper axial positioning of the upper end portion 44 in the passageway 42 when the inner socket 54 is inserted into the outer socket 50. As seen in FIG. 7, the upper edge of the guide thimble upper end portion 44 abuts the ledge 66.

The locking tube 56 is inserted from above the top nozzle 22 into its respective locking position in the hollow upper end portion 44 of one guide thimble 14 forming one inner socket 54. When the locking tube 56 is inserted in its locking position, as seen in FIG. 7, it retains the bulge 58 of the inner socket 54 in the latter's expanded locking engagement with the annular groove 52 and prevents the inner socket 54 from being moved to its compressed releasing position in which it could be withdrawn from the outer socket 50. In such manner, each locking tube 56 maintains its respective one inner socket 54 in locking engagement with the outer socket 50 and thereby the attachment of the top nozzle 22 on the upper end portion 44 of each guide thimble 14.

Additionally, securing means in the form of a slightly outwardly flared (for instance 1-2 degrees) upper peripheral marginal edge portion 68 and a plurality of small dimples 70 located along the exterior of the locking tube 56 are provided to secure the locking tube 56 at the locking position. Thus, when the locking tube 56 is inserted into the inner socket 54, a tight frictional fit is formed with the inner socket. Although the flared upper marginal edge portion 68 does not provide a positive securement, the dimples 70 do. The dimples 70 are preformed by any suitable method, such as by die forming or being coined, and so configured to have a generally pyramidal shape such that the metal forming the dimples substantially resists yielding and dimensional change regardless of the number of insertions and withdrawals of the locking tube 56 into and from the locking position.

Also, when the locking tube 56 is inserted into the upper end portion 44 of the guide thimble 14, the dimples 70 are located at the elevation of the circumferential bulge 58 and are spaced in alignment circumferentially about the exterior of the locking tube so as to extend into the bulge 58. In such manner, the dimples 70 provide a positive interference fit with the guide thimble upper end portion 44 at the bulge 58 thereof which prevents inadvertent withdrawal of the locking tube 56 from the locking position.

Improved Hand Held Tool of the Present Invention

Referring to FIGS. 8-17, there is illustrated the improved tool 48 of the present invention for removing and replacing the locking tube 56 from a locking position in the upper end portion 44 of the guide thimble 14. In its basic components, the tool 48 includes an elongated hollow tubular assembly 72, an actuator assembly 74, a bail assembly 76, a force-imparting member 78, and a hand-operated actuating mechanism 80.

The tubular assembly 72 of the tool 48 has upper and lower opposite end portions 72A, 72B. The bail assembly 76 of the tool 48 is fixedly attached to the upper end portion 72A of the tubular assembly 72, whereas the lower end portion 72B of the tubular assembly 72 is insertable in the locking tube 56. The bail assembly 76 includes a generally flat plate 82 fixed to the upper end portion 72A of the tubular assembly 72 and a U-shaped handle 84 connected to and extending upwardly from the plate 82 for a user to use in gripping the tool 48. The plate 82 serves as a member for receiving a force impacted thereon by the force-imparting member 78. The force-imparting member 78 is disposed about the upper end portion 72A of the tubular assembly 72 and is slidably movable therealong in a reciprocating manner for delivering any number of desired forceful impacts against the force-receiving plate 82 of the bail assembly 76. The force-imparting member 78 is a cylindrical body having an exterior knurled surface 78A for gripping by a user.

More particularly, the tubular assembly 72 is composed of an upper elongated hollow tube 86, a lower guide member 88 and a plurality of lifting members 90. The lower guide member 88 and lifting members 90 are connected to and extend axially from a common tubular base portion 92. The tubular base portion 92 has a male end fitting 92A which is threadably connected to a female end fitting 86A in a lower end of the upper tube 86 of the tubular assembly 72. The lower guide member 88 is composed of a elongated hollow tubular element 94 having an open lower end 94A and a guide element 96 interfitting the open end 94A of the tubular element 94. The guide element 96 has a body portion projecting from the tubular element 94 which defines an upper cylindrical segment 96A and a lower conical nose 96B. The upper cylindrical segment 96A has a section 96C of reduced diameter which is inserted into and attached to the end 94A of the tubular element 94. Further, the end 94A of the tubular element 94 and the cylindrical segment 96A of the guide element body portion 96 have substantially the same outside diameter so as to provide a continuous smooth transition 98 from the tubular element end 94A to the guide element body portion 96. The conical nose 96B and the smooth transition 98 on the guide member 88 facilitates ease of alignment and insertion of the guide member 88 into the hollow locking tube 56 without catching on the upper edge 56A of the locking tube 56 at the transition 98 of the guide member 88.

Also, the tubular element 94 at a region thereof spaced above its lower end 94A has a plurality of apertures 100 (best seen in FIGS. 16 and 18) defined at circumferentially spaced locations about the tubular element. The locking tube lifting members 90 extend within and in concentric relation with the hollow tubular element 94 of the guide member 88. Each lifting member 90 is composed of an elongated finger element 90A rigidly attached at its upper end to the tubular base portion 92 and having a tapered tip 90B at its lower end and a barb-shaped catch element 90C projecting radially outwardly from a central axis A (FIG. 8) of the tubular assembly 72 and tubular element 94 and aligned with the apertures 100 (FIGS. 16 and 18) in the tubular element 94.

Figure 19:
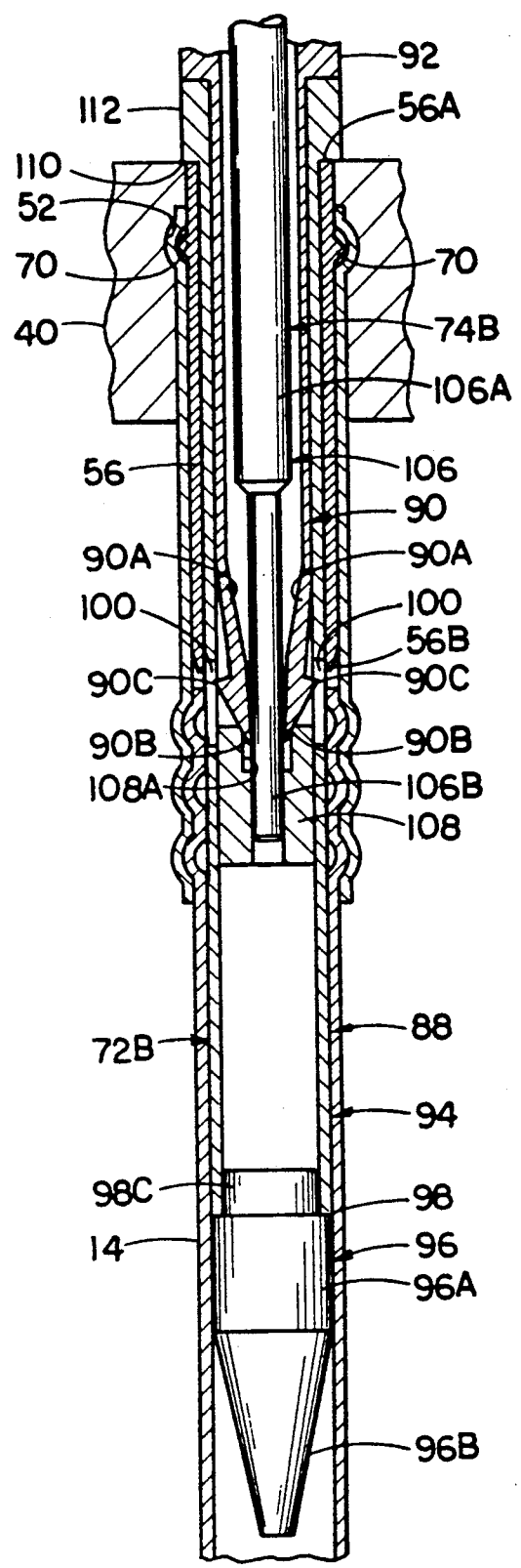
FIG. 19 is an axial sectional view illustrating the tool inserted through a top nozzle adapter plate and into the upper portion of a guide thimble with the lifting members in a contracted condition and the catch elements thereon positioned at an elevation below the lower edge of a locking tube and aligned with the apertures in the guide member tubular element.
Figure 20:
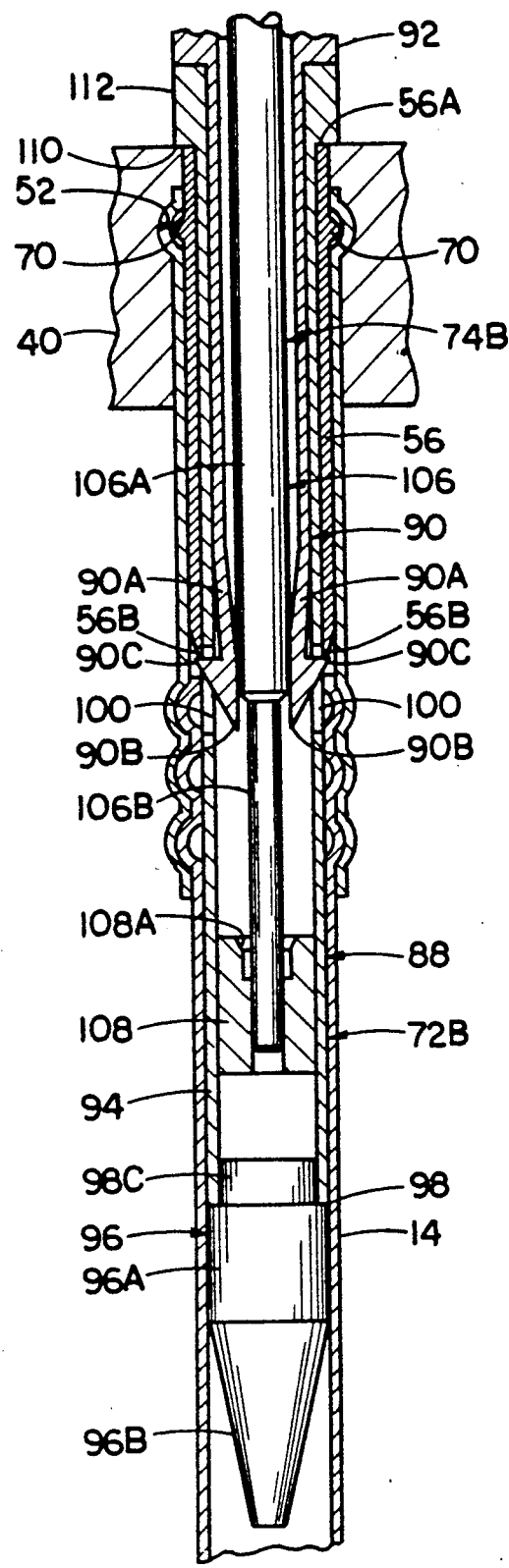
FIG. 20 is a view similar to that of FIG. 19 illustrating the lifting members in an expanded condition and the catch elements thereon extending through the apertures in the guide member tubular element and underlying the lower edge of the locking tube.
Figure 21:
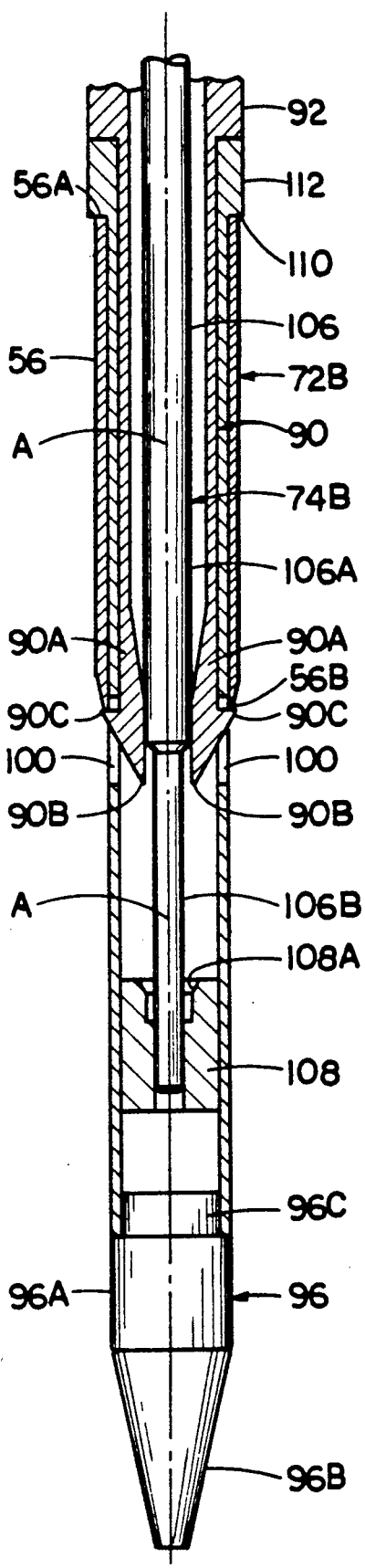
FIG. 21 is an axial sectional view illustrating the tool withdrawn from the top nozzle adapter plate and carrying the removed locking tube thereon.
Figure 22:
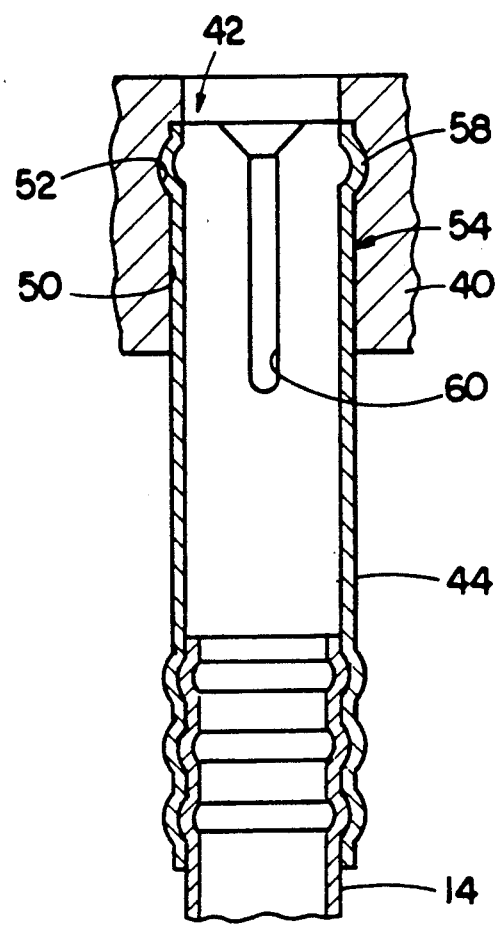
FIG. 22 is a view similar to FIG. 7 illustrating the prior art attaching structure without the locking tube.
Figure 23:
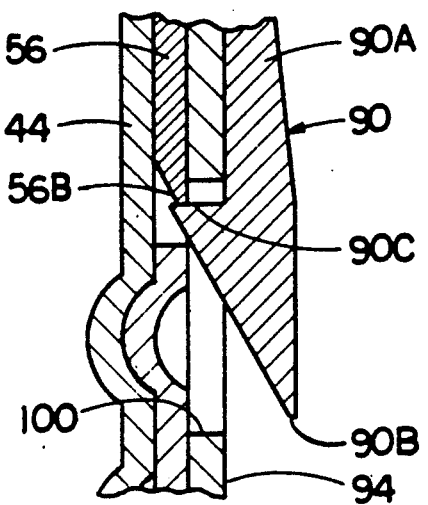
FIG. 23 is an enlarged fragmentary axial sectional view of the tool of FIG. 20 illustrating the catch element on one of the lifting members extending through one of the apertures of the guide member tubular element.

The finger elements 90A are normally disposed in a contracted condition, as seen in FIGS. 8-10 and 19, and are resiliently yieldable to deflect radially outwardly to an expanded condition, as seen in FIGS. 20 and 21 upon application of radially outwardly directed forces thereon. Upon removal of such forces, the finger elements 70A will return to the contracted condition. In the expanded condition of the finger elements 90A, the catch elements 90C defined on the respective finger elements 90A project from the tubular element 94 through the apertures 100 so as to underlie and engage a lower edge 56B of the locking tube 56, as seen in FIGS. 20, 21 and 23. On the other hand, in the contracted condition of the finger elements 90A, the catch elements 90C are retracted from the apertures 100 and disposed inside of the tubular element 94 so as to be disengaged from the lower edge 56B of locking tube 56, as seen in FIG. 19.

Figure 8:
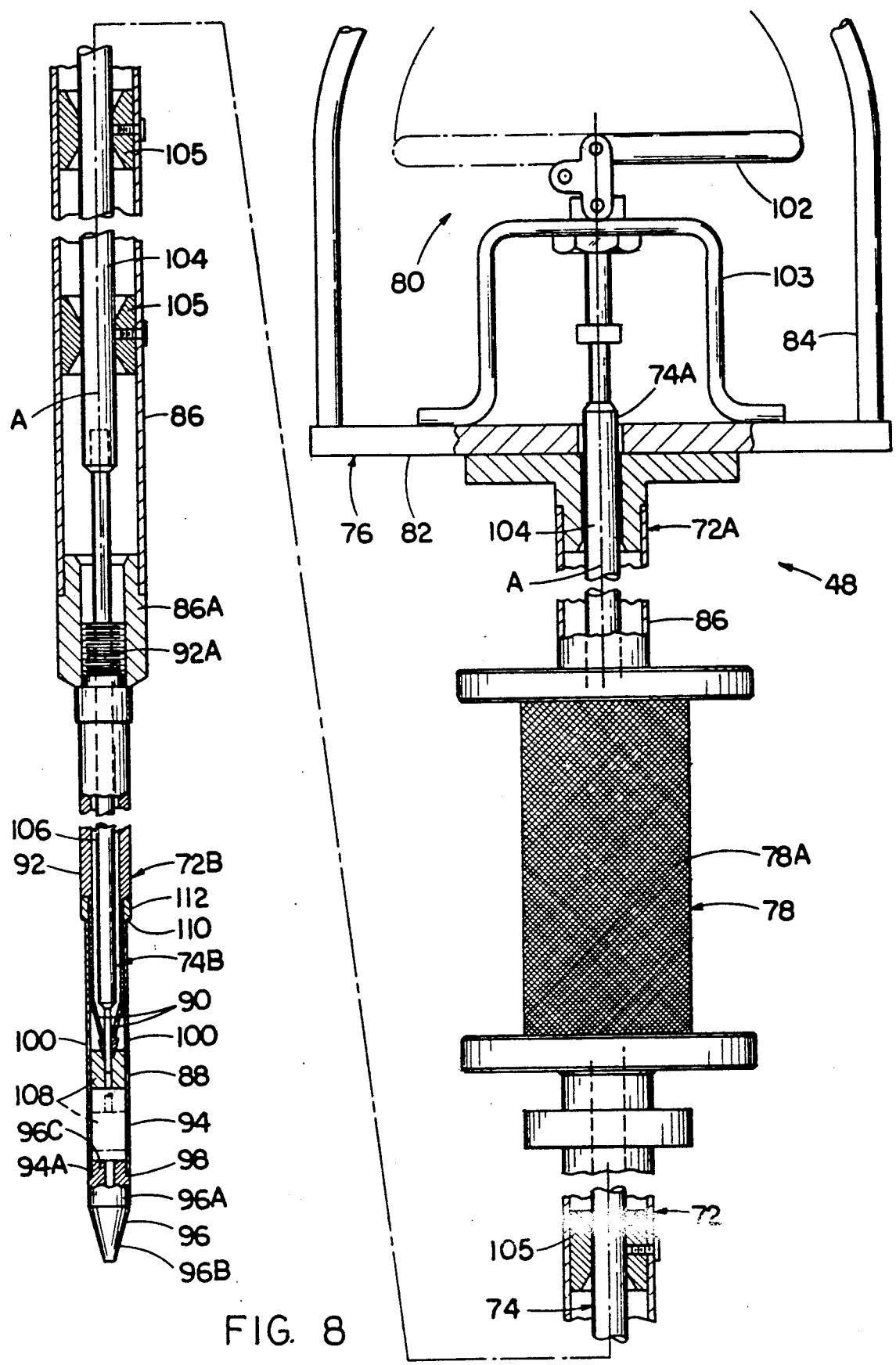
FIG. 8 is a side elevational view of a tool of the present invention for removing and replacing the locking tube of the prior art top nozzle/guide thimble attaching structure of FIGS. 2 and 7, with the tool being illustrated partially sectioned and in a foreshortened form.

The actuator assembly 74 of the tool 48 is mounted through the tubular assembly 72 for axial movement therealong and has upper and lower end portions 74A, 74B. The actuating mechanism 80 has a pivotal lever 102 pivotally mounted by a bracket 103 attached to the plate 82 of the bail assembly 76. The lever 102 is coupled to the upper end portion 74A of the actuator assembly 74. Pivoting of the lever 102 between its solid and dashed line positions, as seen in FIG. 8, causes axial movement of the actuator assembly through a stroke of a precise length downwardly and upwardly relative to the stationarily-held tubular assembly 72.

More particularly, the actuator assembly 74 includes elongated upper and lower shaft members 104, 106 threadably connected together in a tandem arrangement. The upper shaft member 104 at the upper end portion 74A of the actuator assembly 74 is connected to the lever 102, whereas the lower shaft member 106 at the lower end portion 74B of the actuator assembly 74 extends between the lifting members 90 of the tubular assembly 72. The upper shaft member 104 is movably mounted within the upper hollow tube 86 of the tubular assembly 72 by annular bushings 105 attached in and spaced axial along the tube 86.

The lower shaft member 106 has upper and lower tandemly-arranged shaft segments 106A, 106B. The upper shaft segment 106A is larger in outside diameter than the lower shaft segment 106B. Pivotal movement of the lever 102 from the solid to dashed line position of FIG. 8 pushes the actuator assembly 74 downwardly along the central axis A, inserting the upper shaft segment 106A between and removing the lower shaft segment 106B from between the lifting members 90. The larger diameter upper shaft segment 106A forces the lifting members 90 to deflect radially outward from the contracted condition of FIG. 19 to the expanded condition of FIG. 20 which extends the catch elements 90C through the apertures 100 into underlying relation and engagement with the lower edge 56B of the locking tube 56. On the other hand, pivotal movement of the lever 102 from the dashed to solid line position of FIG. 8 pulls the actuator assembly 74 upwardly along the central axis A, removing the upper shaft segment 106A from between and inserting the lower shaft segment 106B between the lifting members 90. The smaller diameter lower shaft segment 106B permits the lifting members 90 to deflect radially inward back to their contracted condition of FIG. 19, which retracts the catch elements 90C from the apertures 100 and out of engagement with the lower edge 56B of the locking tube 56.

The actuator assembly 74 also includes a retractor member 108 attached to a lower end 106C of the lower shaft member 106. The retractor member 108 is a cylindrical body having a tapered recessed portion 108A for engaging the tapered tips 90B of the lifting members 90 when the actuator assembly 74 is moved in the upward direction. The inwardly and downwardly inclined configuration of the tapered recessed portion 108A of the retractor member 108 ensures that the lifting members 90 are forced to deflect from the expanded to contracted condition and their catch elements 90C are disengaged from the lower edge 56B of the locking tube 56.

As seen in FIG. 21, with the lifting members 90 in their expanded condition, the removed locking tube 56 is captured on the outer tubular element 94 between the lifting member catch elements 90C and a downwardly-facing ledge 110 defined on the outer tubular element 94 by an enlarged tubular head 112 formed on the upper end of the tubular element. When the lifting members 90 are deflected back to their contracted condition, the locking tube 56 is released and can drop off the lower end portion 72B of the tubular assembly past the guide member 88.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. A tool for removing a hollow locking tube from a top nozzle of a nuclear fuel assembly, said tool comprising:
   (a) an elongated hollow tubular assembly having upper and lower opposite end portions with said lower end portion insertable in a hollow locking tube, said lower end portion including an outer tubular element having a circumferential guide wall with a plurality of circumferentially spaced apertures, said lower end portion also including a plurality of expandable and contractible lifting members disposed within said tubular element and having catch elements extendable through and retractable from said apertures of said guide wall of said tubular element for engagement with and disengagement from a lower edge of the locking tube; and
   (b) an actuator assembly mounted through said tubular assembly for axial movement therealong and having upper and lower end portions, said lower end portion for actuating said lifting members of said tubular assembly lower end portion between expanded and contracted conditions to extend and retract their catch elements through and from said apertures in said guide wall of said tubular assembly lower end portion for engaging with and disengaging from the lower edge of the locking tube;
   (c) said lower end portion of said actuator assembly including an elongated shaft member extending between and past said lifting members of said tubular assembly lower end portion, said shaft member having upper and lower tandemly-arranged segments, said upper segment being larger in outside diameter than said lower segment such that downward movement of said shaft member removes said lower segment from between said lifting members and inserts said upper segment therebetween causing engagement therewith and expansion of said lifting members from contracted to expanded condition, whereas upward movement of said shaft member removes said upper segment from between said lifting members and inserts said lower segment therebetween permitting contraction of said lifting members from the expanded to contracted condition.

2. The tool as recited in claim 1, wherein said tubular assembly lower end portion includes a guide element interfitting said tubular element at an open lower end thereof and having a body portion projecting therefrom, said end of said tubular element and said body portion of said guide element having substantially the same outside diameter so as to provide a continuous smooth transition from said guide element body to said tubular element end for facilitating insertion of said guide and tubular elements of said tubular assembly lower end portion into the hollow locking tube without catching on an upper edge of the locking tube at said transition.

3. The tool as recited in claim 2, wherein said guide element body portion has an upper cylindrical segment and a lower conical nose, said cylindrical segment having a section of reduced diameter being inserted into said end of said tubular element.

4. The tool as recited in claim 1, wherein:
   said lifting members of said tubular assembly lower end portion have tapered tips; and
   said shaft member extending between and past said lifting members includes a retractor member mounted at a lower end of said shaft member, said retractor member having a tapered portion for engaging said tapered tips of said lifting members and ensuring that said lifting members move from said expanded to contracted condition as said shaft member is moved upwardly.

5. A tool for removing a hollow locking tube from a top nozzle of a nuclear fuel assembly, said tool comprising:
   (a) an elongated hollow tubular assembly having upper and lower opposite end portions, said lower end portion of said tubular assembly being insertable in said locking tube and including a guide member and a plurality of locking tube lifting members;
   (b) said guide member of said tubular assembly having a central axis and being composed of an elongated hollow tubular element having an open lower end and a guide element interfitting said tubular element at said open lower end and having a body portion projecting therefrom, said tubular element at a region thereof spaced from said lower end having a plurality of apertures defined at circumferentially spaced locations about said tubular element, said end of said tubular element and said body portion of said guide element having substantially the same outside diameter so as to provide a continuous smooth transition from said guide element body portion to said tubular element end for facilitating insertion of said guide and tubular elements of said guide member into the hollow locking tube without catching on an upper edge of the locking tube at said transition of said guide member;
   (c) said lifting members of said tubular assembly extending within said hollow tubular element of said guide member and composed of a plurality of finger elements being movable between expanded and contracted conditions away from and toward said central axis of said guide member and catch elements defined on said respective finger elements projecting radially outwardly from said central axis of said guide member and aligned with said apertures in said tubular element of said guide member, said catch elements projecting from said tubular element through said apertures for underlying and engaging a lower edge of the locking tube when said finger elements are at said expanded condition and retracted from said apertures within said tubular element for disengaging and retraction from the lower edge of the locking tube when said finger elements are at said contracted condition; and (d) means extending through said hollow tubular assembly and being actuatable for causing expansion of said finger elements from said contracted to expanded condition and permitting contraction of said finger elements from said expanded to contracted condition;

(e) said lower end portion of said actuator assembly including an elongated shaft member extending between and past said lifting members of said tubular assembly lower end portion, said shaft member having upper and lower tandemly-arranged segments, said upper segment being larger in outside diameter than said lower segment such that downward movement of said shaft member removes said lower segment from between said lifting members and inserts said upper segment therebetween causing engagement therewith and expansion of said lifting members from contracted to expanded condition, whereas upward movement of said shaft member removes said upper segment from between said lifting members and inserts said lower segment therebetween permitting contraction of said lifting members from the expanded to contracted condition.

6. The tool as recited in claim 5, wherein said guide element body portion has an upper cylindrical segment and a lower conical nose, said cylindrical segment having a section of reduced diameter being inserted into said end of said tubular element.

7. The tool as recited in claim 5, wherein said actuatable means includes an actuator assembly having upper and lower end portions and being mounted through said hollow tubular assembly for axial movement therealong.

8. The tool as recited in claim 5, wherein:
said lifting members of said tubular assembly lower end portion have tapered tips; and
said shaft member extending between and past said lifting members includes a retractor member mounted at a lower end of said shaft member, said retractor member having a tapered portion for engaging said tapered tips of said lifting members and ensuring that said lifting members move from said expanded to contracted condition as said shaft member is moved upwardly.

9. The tool as recited in claim 7, further comprising:
a force-receiving member attached to said upper end portion of said tubular assembly; and
a force-imparting member disposed about said upper end portion of said tubular assembly and slidably movable therealong in a reciprocating manner for delivering at least one forceful impact against said force-receiving member.

10. The tool as recited in claim 9, wherein said force-receiving member is a bail assembly including a generally flat plate fixed to said upper end portion of said tubular assembly and a handle connected to and extending upwardly from said plate.

11. The tool as recited in claim 10, further comprising:
means attached to said upper end portion of said actuator assembly and being operable to cause axial movement of said elongated shaft thereof.

12. For use with a reconstitutable fuel assembly including a top nozzle with an adapter plate having at least one passageway, at least one guide thimble with an upper end portion and an attaching structure having a hollow locking tube for releasably locking the upper end portion of the guide thimble within the passageway of the top nozzle adapter plate, said locking tube having upper and lower opposite edges, a tool for removing the locking tube from its locking position, comprising:

(a) an elongated hollow tubular assembly having upper and lower opposite end portions, said lower end portion of said tubular assembly being insertable in said locking tube and including (i) a guide member having a central axis and being composed of an elongated hollow tubular element having an open lower end and a guide element interfitted with said tubular element at said open lower end and having a body portion projecting therefrom, said tubular element at a region thereof spaced from said lower end having a plurality of apertures defined at circumferentially spaced locations about said tubular element, said end of said tubular element and body portion of said guide element having substantially the same outside diameter so as to provide a continuous smooth transition from said tubular element end to said guide element body portion for facilitating insertion of said guide and tubular elements of said guide member into said hollow locking tube without catching on said upper edge of said locking tube at said transition of said guide member, and (ii) a plurality of locking tube lifting members extending within said hollow tubular element of said guide member and composed of a plurality of finger elements having tapered tips and being movable between expanded and contracted conditions away from and toward said central axis of said guide member and catch elements defined on said respective finger elements projecting radially outwardly from said central axis of said guide member and aligned with said apertures in said tubular element of said guide member, said catch elements projecting from said tubular member through said apertures for underlying a lower edge of said locking tube when said finger elements are at said expanded condition and retracted from said apertures within said tubular element for withdrawal from the lower edge of said locking tube when said finger elements are at said contracted condition; and (b) an actuator assembly having upper and lower end portions and being mounted through said hollow tubular assembly for axial movement therealong, said lower end portion of said actuator assembly including (i) an elongated shaft member extending between said lifting members of said tubular assembly and having upper and lower tandemly-arranged shaft segments, said upper shaft segment being larger in outside diameter than said lower shaft segment such that downward movement of said shaft member along said central axis will remove said lower shaft segment from between said lifting members and insert said upper shaft segment between said lifting members causing engagement therewith and expansion of said finger elements from said contracted to expanded condition, whereas upward movement of said shaft member along said central axis will remove said upper shaft segment from between said lifting members and insert said lower shaft segment therebetween permitting contraction of said finger elements from said expanded to contracted condition, and (ii) a retractor member mounted to a lower end of said shaft member and having a tapered portion for engaging said tapered tips of said finger elements and ensuring that said lifting members move from said expanded to contracted condition as said shaft member is moved upwardly.

13. The tool as recited in claim 12, further comprising:
a force-receiving member attached to said upper end portion of said tubular assembly; and
a force-imparting member disposed about said upper end portion of said tubular assembly and slidably movable therealong in a reciprocating manner for delivering at least one forceful impact against said force-receiving member.

14. The tool as recited in claim 13, wherein said force-receiving member is a bail assembly including a generally flat plate fixed to said upper end portion of said tubular assembly and a handle connected to and extending upwardly from said plate.

15. The tool as recited in claim 14, further comprising:
means attached to said upper end portion of said actuator assembly and being operable to cause axial movement of said elongated shaft thereof.

16. The tool as recited in claim 13, wherein said guide element body portion has an upper cylindrical segment and a lower conical nose, said cylindrical segment having a section of reduced diameter being inserted into said end of said tubular element.

* * * * *